United States Patent [19]
Benedek et al.

[11] Patent Number: 4,612,995
[45] Date of Patent: Sep. 23, 1986

[54] DRAFT VEHICLE WITH LOAD SENSOR AND REMOVABLE SUPPORT

[75] Inventors: Vasile Benedek, Brühl; Volker Hückler, Radolfzell; Hilmar S. Ortlepp, Mannheim, all of Fed. Rep. of Germany

[73] Assignee: Deere & Company, Moline, Ill.

[21] Appl. No.: 663,291

[22] Filed: Oct. 22, 1984

[30] Foreign Application Priority Data

Oct. 25, 1983 [EP] European Pat. Off. ........ 83110621.6

[51] Int. Cl.[4] ............................................. A01B 63/112
[52] U.S. Cl. ............................................ 172/7; 172/439
[58] Field of Search ...................... 172/2, 7, 8, 9, 10, 172/11, 12, 430, 439, 450; 280/446 A, 456 A, 460 A, 461 A, 507, 511; 73/862.57

[56] References Cited

U.S. PATENT DOCUMENTS

| | | | |
|---|---|---|---|
| 2,940,530 | 6/1960 | DuShane | 172/7 |
| 3,260,537 | 7/1966 | Kelley | 280/507 |
| 4,142,733 | 3/1979 | Bernini | 280/446 A |
| 4,286,669 | 9/1981 | Lasoen | 172/7 |
| 4,411,319 | 10/1983 | Wood et al. | 172/10 |

FOREIGN PATENT DOCUMENTS

| | | |
|---|---|---|
| 2469628 | 5/1981 | France . |
| 2058538 | 4/1981 | United Kingdom . |
| 2079577 | 1/1982 | United Kingdom . |

*Primary Examiner*—Richard T. Stouffer

[57] ABSTRACT

Disclosed herein is a support for supporting the load sensing bar of a draft control system. The support includes an L-shaped bracket which is adapted to have one leg attached to a vehicle and the other extending outwardly therefrom. The attached leg has a through opening with a spherical bearing therein through which the load sensing bar passes. A stop is carried on the other end of the outwardly projecting leg to limit bending of the bar. A clip is also carried by the outwardly extending leg and extends to a position where it will prevent the bar from sliding out of the bearing in the attached leg in the event the bar breaks.

4 Claims, 2 Drawing Figures

DRAFT VEHICLE WITH LOAD SENSOR AND REMOVABLE SUPPORT

BACKGROUND OF THE INVENTION

The present invention relates generally to a draft control system of the type normally used on agricultural tractors and more specifically relates to the support for a load sensing bar which forms part of the draft control system.

Many draft control systems currently in use today utilize a bending bar to sense the draft load in the manner disclosed in U.S. Pat. No. 2,940,530. The bar normally extends through the transmission casing of a tractor and has draft links attached to its opposite ends. When load is applied to the draft links, the bar is caused to bow about its supports in the opposite sides of the casing and the movement of the bar, as it bows, is utilized to operate a valve which controls the flow of fluid to and from a hydraulic cylinder which, through appropriate mechanical linkage, causes the draft links to be raised and lowered. Devices of this type are utilized to regulate the working depth of the implement attached to the draft links in order to maintain a relatively constant draft load on the tractor.

As shown in U.S. Pat. No. 2,940,530, it has been known to provide a stop member to limit the bending of the bar to a predetermined amount which lies within the normal working range of the load control system. Such a stop prevents damage to the shaft in the event it is subjected to an excessively high impulse load, such as may occur if a plow share encounters a rock or other relatively immovable object. As shown in U.S. Pat. No. 4,315,548, it has been known to support the load control shaft in spherical bearings which distributes the load on the shaft over a relatively large area, thus avoiding a point or line contact which could cause an overstress and failure of the shaft. This area of contact also reduces abrasive wear on the shaft as it slides in its support due to the bending action. Also as shown in U.S. Pat. No. 4,315,548, it has been known to support the spherical bearing in a mount or bracket which is separate from, but securely attached to, the tractor transmission casing. This not only eliminates the necessity to machine the casing in the area of the bar support, but makes the support easily removable for repair or replacement.

SUMMARY OF THE INVENTION

The general object of the present invention is to provide a simplified and improved support for a load sensing bar which is part of a draft control system. A more specific object of the invention is to provide a support for a load sensing bar which includes a mount which can be removably secured to a vehicle and which, as a single unit, carries a spherical bearing for the load sensing bar and a stop to limit the bending movement of the load sensing bar.

Still another object of the present invention is to provide a motion limiting device for a draft sensing bar which includes an aperture which extends over the end of the bar, the aperture permitting the desired amount of movement of the bar, and in which a sleeve having an arched surface is provided on the bar for engagement with the walls of the aperture to thereby ensure that the loads exerted on the stop member are spaced from the edges of the stop member.

A still further object of the present invention is to provide a support or mount for a draft system load sensing bar which includes provision for preventing axial movement of the bar out of its support in the event of a bar failure.

The above objects and advantages are accomplished by providing an L-shaped support member which carries a cylindrical bearing in one leg thereof. The leg carrying the cylindrical bearing is adapted to be securely attached to a vehicle and the load sensing bar will extend through the spherical bearing and into the vehicle. The second leg of the L-shaped support extends outwardly from the vehicle and carries a stop member which is adapted to contact the load sensing bar outboard of an associated draft link and limit movement of the bar to within a desired range. In addition, a clip is carried by the outward projecting leg of the L-shaped support member and extends over the outer end of the bar to prevent axially outward movement of the bar in the case that it fails inside of the bearing or vehicle.

The exact structure of the load sensing bar support and how it accomplishes the above and additional advantages will become more apparent to those skilled in the art from a reading of the following detailed description when taken in conjunction with the accompanying drawing.

DESCRIPTION OF THE PREFERRED EMBODIMENT

Figure 1:
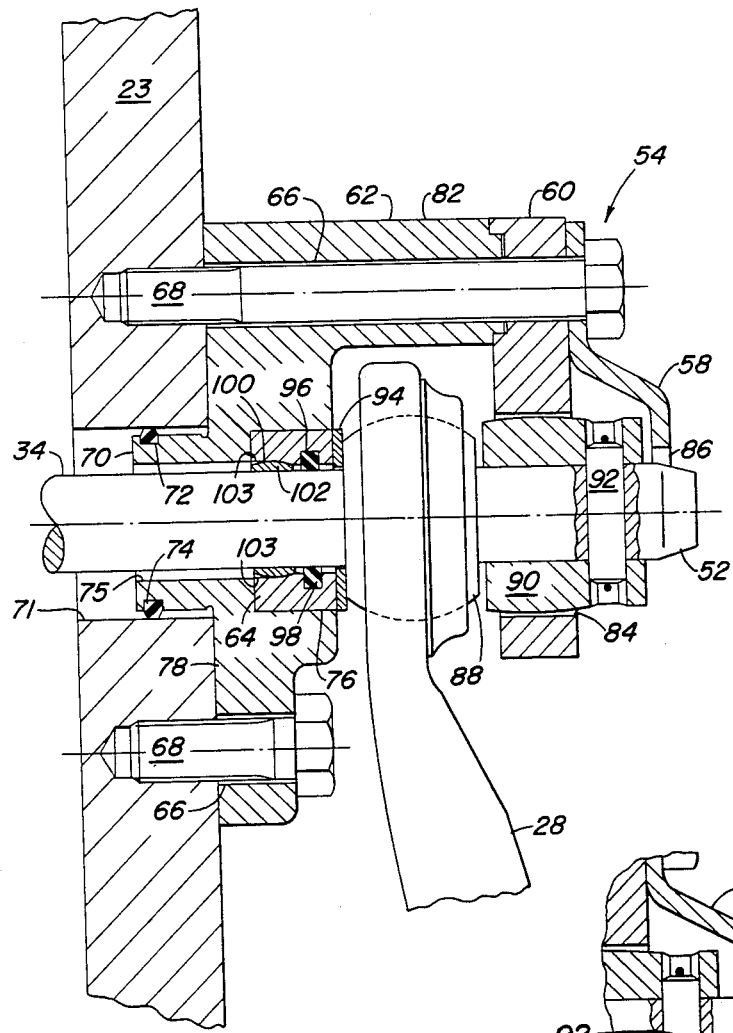
FIG. 1 is a horizontal sectional view of a draft control system load sensing bar support according to the present invention.

The load control support of the present invention is indicated in its entirety by the numeral 54. The support includes an L-shaped bracket or mount 62 which is adapted to have one leg 78 secured to a transmission casing 23 by bolts 68 which extend through openings 66 in the mount. The second leg of the L-shaped mount extends laterally outwardly from the transmission casing 23.

A ring-shaped neck is provided on the leg 78 which lies against the transmission casing 23 and extends in a direction opposite from the leg 82, and this neck 70 extends into a suitable opening 71 provided in the transmission casing. The ring-shaped neck 70 has a central bore 75 through which the load sensing bar or shaft 34 extends. Bore 75 has a diameter which is greater than the outer diameter of the load sensing shaft by an amount sufficient to not hinder the bending motion of the load sensing shaft 34. A ring groove 72 is provided in the outer surface of the ring-shaped neck 70 and holds an expanding sealing ring 74 which prevents oil from leaking from the transmission casing between the casing and the mount 62.

On the side opposite from the ring-shaped neck 70, the leg 78 is provided with a circular recess 76 which has a diameter approximately equal to the outside diameter of the ring-shaped neck 70. A bearing bush 64 is press fit into the recess 76. On its inner surface, the bearing bush 64 is provided with an arched concave bearing surface 100 which mates with an arched convex bearing surface on a ring 102. For the purpose of assembling the ring 102 in the bearing bush 64, the bearing bush is provided with two radially opposed recesses through which the ring can be inserted when rotated 90° from the plane shown in the drawing. The load sensing shaft 34 extends through the ring 102 and, for purposes which will be explained hereinafter, is slidable within the ring 102. Bush 64 and ring 102 form a spherical bearing which supports the load sensing shaft 34.

Outboard of the bearing ring 102, the bush 64 is also provided with a groove 96 which holds an elastic seal 98. This seal 98 prevents leakage of oil from the transmission casing through the bore 75 and bush 64, but permits the oil to provide lubrication to the bearing formed by the ring 102 and bush 64.

A stop 60 is secured to the outer end of leg 82 by means of the bolt 68 and extends generally parallel to the leg 78. The stop member is provided with a relatively large bore 84 which receives the load control shaft 34. The diameter of the bore 84 is, as will be more fully explained hereinafter, determined by the bending characteristics of the load control shaft 34. A sleeve 90 having a convex outer surface is positioned on the load control shaft 34 within the bore 84 of the stop 60. The sleeve 90 is held in position on the load sensing shaft 34 by means of a wired pin 92. The sleeve 90 extends beyond the outer surface of the stop 60 sufficiently that the pin 92 can be inserted through the sleeve and the load control shaft and be secured with the wire beyond the outer surface of the stop 60. The largest outer diameter of the sleeve 90 is less than the diameter of the bore 84 to permit the bending movement of the load sensing shaft 34. The radius of curvature of the outer surface of the sleeve 90 is made as large as possible so that the contact between the sleeve 90 and surface of the bore 84 approaches an area contact rather than a point contact. This radius of curvature is limited, however, by the fact that the contact should occur away from the edges of the stop member as the rod bends.

The forward end of the conventional draft link 28 is mounted on the load sensing shaft 34 between the sleeve 90 and bush 64 through a conventional link ball 88. A spacer ring 94 can be placed between the bearing bush 64 and link ball 88 to reduce the side-to-side play of the link ball 88. This ring 94 is also an easy replaceable item which would relieve the bush 64 of wear.

Finally, a Z-shaped clip is also secured to the leg 82 outboard of the stop 60 by the bolt 68. As illustrated in FIG. 1, the free end of the Z-shaped clip 58 is provided with a recess 86 which extends over the extreme outer end portion 52 of the load sensing shaft 34. The maximum dimension of the recess 86 is less than the minimum outside diameter of the sleeve 90 so that engagement between the sleeve 90 and the clip 58 will prevent outward movement of the load sensing shaft 34. In the event of a breakage in the shaft 34, the clip 58 will prevent the shaft from sliding out of the bush 64 and thus prevent the loss of fluid through the bore 75 and bush 64.

Figure 2:
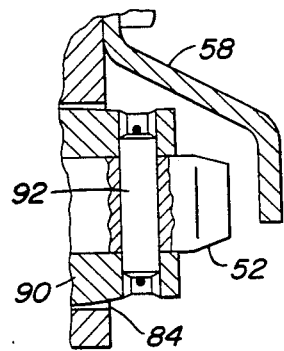
FIG. 2 is a horizontal sectional view of a portion of the support illustrated in FIG. 1, but illustrating a modification of a part thereof.

An alternative form of the clip is illustrated in FIG 2. Rather than have the Z-shaped clip extend over the shaft 52 where it can be engaged by the sleeve 90, the clip 58 overlaps the outer end of the shaft 34 and serves the same purpose.

The load sensing shaft support described above and shown in the drawing provides many desirable features in an easily mountable and removable package. The sleeve 102 reduces stress on the load sensing shaft 34 by spreading the load over an area of the shaft, whereas a conventional fulcrum mount would apply the entire load on a line contact. Also, by spreading the load on the shaft over an area and thereby reducing the load at any point, wear on the shaft caused by sliding of the shaft in the bearing is reduced. The sliding movement of the shaft results from the bending of the shaft. That is, as the shaft is bowed, its ends are drawn closer to each other and therefore the shaft moves in the fixed bearing. Because of the surface contact provided between the arched surfaces of the sleeve 102 and bush 64, these parts also receive the load with an area contact rather than a line contact. Furthermore, the bearing formed by the bush 64 and sleeve 102 are exposed to the fluid in the transmission casing 23 and therefore their bearing surfaces are well lubricated.

The stop member 60 with its bore 84 and the sleeve 90 keep the deflection or bowing action of the shaft 34 within its normal working range and prevent unduly high impulse forces from bowing the rod or shaft 34 beyond its elastic limit and even possibly breaking the shaft 34. These high impulse forces could be exerted in either the fore or aft direction (the top of the drawing should be taken as the forward direction and the bottom of the drawing as the rearward direction). For example, a high impulse force to the rear would occur if a plow were attached to the draft links and struck a rock or other relatively immovable object. A forward high impulse force could occur if a mounted implement were in a transport position when the tractor hit a bump. The stop member 60 can also be used on tractors which have load sensing bars of different bending characteristics simply by replacing the sleeve 90 with one which has a different outside diameter.

The clip 58 provides the additional feature for preventing the shaft 34 from sliding out of the bearing in the event there should be a shaft failure. This not only prevents the loss of fluid from the transmission casing 23 through the bore 75 and the bush 64, but prevents possible damage to an implement attached to the draft link 28.

As will be well understood by those skilled in the art, the load sensing shaft 34 extends completely through the transmission casing 23 and extends beyond both sides thereof so that the load sensing shaft support 54 will be duplicated on the opposite side of the transmission casing.

Having thus described a preferred embodiment of the invention, various modifications within the spirit and scope of the invention will become apparent to those skilled in the art and can be made without departing from the underlying principles thereof. For example, the bearing bush 64 could be designed to be screwed into the leg 78 to facilitate easy replacement. Also, the bearing bush 64 and the neck 70 could be constructed as a single piece that could be screwed or pressed into and through a bore in the leg 78 of mount 62. Therefore, the invention should not be limited to the specific preferred embodiment disclosed in the drawing, but only by the scope and spirit of the following claims.

We claim:

1. In a draft vehicle having a load sensing and adjusting system which includes a bending bar extending transversely through a casing forming part of the vehicle and is slidably supported at opposite sides of the casing by spherical bearing members removably mounted on the opposite sides of the casing, and draft links attached adjacent to the outer ends of the bar outboard of the bearings members whereby a load on the draft links causes said bar to bend and slide within and pivot on said bearing members, the improvement comprising: each bearing member is carried by one leg of an L-shaped support which is removably secured to the side of the vehicle with the other leg thereof extending outwardly from the casing; a deflection limiting member is attached to the outwardly extending leg of each L-shaped support, each deflection limiting member being provided with an aperture positioned over the corresponding outer end portion of the bar and engageable therewith upon a predetermined maximum bending of the bar, the aperture in each bar having a dimension in the nominal direction of movement of the bar greater than the dimension of the bar in the same direction.

2. The combination set forth in claim 1 wherein a sleeve having an arched outer surface along the axis of the bar is positioned on and fixed to each end of the bar within the aperutre provided in the deflection limiting member and a clip is secured to each outwardly projecting leg and has a recess which extends over the corresponding extreme outer portion of the bar, the recess being smaller than the largest diameter of the sleeve.

3. The combination set forth in claim 1 wherein a clip is secured to each outwardly projecting leg and extends to a position overlaying the corresponding end of the bar.

4. The combination set forth in claim 1 wherein the leg of each L-shaped support carrying the bearing member is provided with a neck-shaped projection which extends into the casing, a first sealing member surrounds the neck-shaped projection and engages the casing, and a second sealing member acts between the bar and the one leg of the L-shaped support outboard of the spherical bearing member.

* * * * *